(12) United States Patent
Sinha

(10) Patent No.: US 7,979,562 B2
(45) Date of Patent: *Jul. 12, 2011

(54) SERVICE LEVEL AGREEMENTS AND MANAGEMENT THEREOF

(75) Inventor: Himanshu S. Sinha, Acton, MA (US)

(73) Assignee: Verizon Laboratories Inc., Waltham, MA (US)

( * ) Notice: Subject to any disclaimer, the term of this patent is extended or adjusted under 35 U.S.C. 154(b) by 300 days.

This patent is subject to a terminal disclaimer.

(21) Appl. No.: 11/539,489

(22) Filed: Oct. 6, 2006

(65) Prior Publication Data

US 2007/0088819 A1  Apr. 19, 2007

Related U.S. Application Data

(63) Continuation of application No. 09/425,088, filed on Oct. 22, 1999, now Pat. No. 7,120,694.

(51) Int. Cl.
  *G06F 15/173* (2006.01)
  *G06F 15/16* (2006.01)

(52) U.S. Cl. ........................... 709/228; 709/224

(58) Field of Classification Search .................. 709/224, 709/228
See application file for complete search history.

(56) References Cited

U.S. PATENT DOCUMENTS

| | | | |
|---|---|---|---|
| 6,117,188 A | 9/2000 | Aronberg et al. | |
| 6,243,396 B1 * | 6/2001 | Somers | 370/469 |
| 6,269,401 B1 | 7/2001 | Fletcher et al. | |
| 6,272,110 B1 * | 8/2001 | Tunnicliffe et al. | 370/232 |
| 6,304,892 B1 * | 10/2001 | Bhoj et al. | 709/202 |
| 6,360,254 B1 | 3/2002 | Linden et al. | |
| 6,363,053 B1 * | 3/2002 | Schuster et al. | 370/230 |
| 6,405,251 B1 | 6/2002 | Bullard et al. | |
| 6,442,608 B1 | 8/2002 | Knight et al. | |
| 6,446,200 B1 * | 9/2002 | Ball et al. | 713/1 |
| 6,459,682 B1 | 10/2002 | Ellesson et al. | |
| 6,654,886 B1 | 11/2003 | Challener et al. | |
| 6,681,240 B1 | 1/2004 | Armstrong et al. | |
| 6,704,289 B1 * | 3/2004 | D'Souza et al. | 370/252 |
| 6,912,232 B1 * | 6/2005 | Duffield et al. | 370/468 |
| 7,058,704 B1 * | 6/2006 | Mangipudi et al. | 709/223 |
| 7,174,018 B1 * | 2/2007 | Patil et al. | 380/258 |
| 7,499,453 B2 * | 3/2009 | Carlson et al. | 370/395.2 |
| 7,600,007 B1 * | 10/2009 | Lewis | 709/223 |
| 7,725,570 B1 * | 5/2010 | Lewis | 709/224 |
| 7,725,571 B1 * | 5/2010 | Lewis | 709/224 |
| 7,730,172 B1 * | 6/2010 | Lewis | 709/224 |

OTHER PUBLICATIONS

Loyall et al., "Specifying and Measuring Quality of Service in Distributed Object Systems", Proc. of ISORC/98, Apr. 1998.
Pandey et al., "Supporting Quality of Service in HTTP Servers", Proc. of the 7th Annual SIGACT-SIGOPS Symposium on Principles of Distributed Computing, Jun. 1998.
Sabata et al., Taxonomy of QoS Specifications, Proc. of WORDS '97, Feb. 1997.
Wales, "WIDL: Interface Definition for the Web", Internet Computing, 3(1): 55-59, Jan./Feb. 1999.
http://www.internet solutions.enterprise.hp.com/webgos/products/infocenter/gps2whitepaper.pdt.
http://www.segue.com/html/solutions/pdf/silkmeter.pdf.

* cited by examiner

*Primary Examiner* — Douglas B Blair

(57) ABSTRACT

Method and apparatus for service level agreement formation and management is described. More particularly, a service level agreement (SLA) manager is described. This SLA manager comprises an admission controller, a specification module and a performance measurement module. Such SLA manager is interposed between one or more client computer systems and a service provider computer system.

11 Claims, 5 Drawing Sheets

SERVICE LEVEL AGREEMENTS AND MANAGEMENT THEREOF

FIELD OF THE INVENTION

The present invention generally relates to information technology, and more particularly relates to managing one or more services for forming and complying with service level agreements.

BACKGROUND OF THE INVENTION

Recent technological advances combined with market forces have resulted in the creation of new services composed of other services. The term "composite service" is used to describe these new services. Composite service providers pull together a plurality of component services to provide a composite service. Composite services conventionally span several participant organizations. Terms such as "virtual enterprise" and "virtual organization" are conventionally used to describe this type of collection of organizations. A participant organization may provide component services to one or more virtual enterprises. Each component service provider implements a service by executing a process. Implementation of a composite service requires execution of a process that spans multiple organizations. The execution of such multi-organizational processes conventionally involves interaction among participant organizations' computer systems.

By way of example and not limitation, today there are virtual enterprises reselling web search services. Such virtual enterprises receive a query from a user. This query is then used to query selected web search services offered by component service providers of which this virtual enterprise is a client.

Referring to the block diagram of FIG. 1, a group of component service providers' computer systems 20 comprise component service providers 20a and 20b. Component service providers 20a and 20b have respective service implementations 19j and 19k. Service implementations 19j and 19k may be put in communication with composite service providers 10a and 10b of a group of composite service providers' computer systems 10. Each composite service provider 10a and 10b may have one or more client processes 13m to 13n and 13q to 13p, respectively.

Continuing the above-mentioned example, suppose a user of composite service provider 10a places a query for a World Wide Web search. This query invokes client process 13m causing a request to be sent to service implementations 19j and 19k for searching the World Wide Web using respective search engines associated with these services. Results from such searches may then be provided from service implementations 19j and 19k to client process 13m. Hence, in this example, a user executes separate searches on separate search engines of separate service providers from a single query on another separate service provider. In other words, a composite service provider executes a business process which in turn causes component service providers to execute respective business processes.

Accordingly, it should be understood that a component service provider may have several services to offer its clients. Thus, component service providers may have a platform of services available to subscribers or clients. Such services may be invoked through various invocation infrastructures such as Common Object Request Broker Architecture ("CORBA"), Java Remote Method Invocation ("Java RMI"), Hypertext Transport Protocol ("HTTP"), among others. Moreover, this invocation may be manual; for example, a phone call from a composite service provider representative to a component service provider representative.

In the telecommunications field, Competitive Local Exchange Carriers (CLECs) resell local telephone service of Incumbent Local Exchange Carriers (ILECs). Thus, a CLEC may offer services of several ILECs of which it is a client and vise versa. In a CLEC business model, there is interaction between ILEC and CLEC business processes. By way of example and not limitation, a CLEC customer service representative may interact with provisioning ILEC processes to place an order, inquire about an order, or to cancel an order.

Accordingly, with respect to the above-mentioned Internet example and telecommunications example, in order to offer their selection of services, a composite service provider relies on services of its component service providers. Therefore, it is incumbent upon composite service providers as clients of component service providers to enter into agreements to guarantee that service needs are met. Examples of such guaranteed service needs may include maximum response time and minimum throughput. These agreements are referred to hereinafter as Service Level Agreements (SLAs). SLAs also assist component service providers in managing their resources to meet their client's needs. Without such SLAs, a component service provider may be overwhelmed by requests from one client organization, which can affect service level to other clients.

SLAs pertain to services at an application level, as distinguished from end-to-end quality of service (QoS). QoS conventionally pertains to quality parameters of a system infrastructure, or more particularly network performance. A taxonomy of QoS may be found in "Taxonomy of QoS Specifications," by Bikash Sabata, et al., *Proceedings of WORDS '97*, February 1997.

Quality objects, which are described in more detail in "Specifying and Measuring Quality of Service in Distributed Object Systems," by Joseph P. Loyall, et al., *Proceedings of ISORC '98*, April 1998, facilitate specification monitoring of QoS contracts between clients and service providers. However, this specification monitoring is directed at service implementation details and not invoked functionality. Moreover, in QoS contracts, a client is required to specify resource requirements. However, a client may have limited knowledge of resource usage of an invoked service.

A QoS web server is described in "Supporting Quality of Service in HTTP Servers," *Proceedings of the Seventeenth Annual SIGACT-SIGOPS Symposium on, Principles of Distributed Computing*, June 1998. This QoS web server allows allocation of server resources to specific web page requests. System capacity is represented by an estimate of bytes per second served by the server. Thus, issues of guarantees to clients are not addressed.

A product called "SilkMeter" from Segue Software, Inc. of Lexington, Mass., is a software system for supporting usage control in CORBA environments. SilkMeter supposedly controls object usage and access based upon customer-defined usage policies, and provides metering capabilities allowing software owners to monitor usage activity and to bill users accordingly. However, SilkMeter does not support implementation of SLAs.

Hewlett-Packard Company of Palo Alto, Calif., has announced a web QoS strategy. In this announced strategy, website operators may create classes of users with priorities assigned to each class, and more particularly operators may create service classes and allocate capacity to each of them. However, this strategy falls short of providing mechanisms that allow organizations to enter into SLAs. For example, in this strategy, if two organizations are at the same priority level, then it is possible that requests from only one of them will be serviced.

Accordingly, it would be desirable to provide specification and fulfillment thereof for SLAs between organizations. Advantageously, it would be desirable for such SLA specification and fulfillment to be applicable to a variety of services and implementations and to facilitate deployment over existing distributed system infrastructures.

SUMMARY OF THE INVENTION

An aspect of the present invention is a service level agreement manager. Such a service level agreement manager is disposed between one or more client process run on one or more computer systems and a service implementation run on one or more other computer systems. Moreover, a client process may be a service implementation. Such a service level agreement manager comprises an admission controller, a performance measurement module and a specification module.

Another aspect of the present invention is a method for service level formation. More specifically, a specification module of a service level agreement manager is invoked. Performance information is obtained from a performance measurement module. A client provides anticipated usage information for a target service. The performance information and usage information is compared to determine if a basis for forming a service level agreement exists.

Another aspect of the present invention is a method for managing system performance. More specifically, a service level agreement manager determines whether a client's request is within the scope of a service level agreement. For example, it may be determined whether a request is within the scope of a service level agreement in effect between a requesting client and a service provider of a service implementation for which this client's request is targeted. If the request is within the scope of the service level agreement, the service level agreement is provided to a performance measurement module and to a service organization's service implementation. Results are then obtained from this service implementation in response to this request. Performance parameters associated with sending a request from and receiving a response to a service level agreement manager may be measured. These performance parameters may then be check against performance parameters agreed to in the service level agreement.

Advantageously, a service level agreement manager in accordance with the present invention may be independent of service implementation with respect to compatibility issues. Such a service level agreement manager need not directly monitor or measure resource usage of a service provider, rather it can measure response performance therefrom. Moreover, any of several well-known optimization technique can be used within such a service level agreement manager. Furthermore, such a service level agreement manager may be used with any of a variety of invocation infrastructures.

These and other features, advantages, objects and embodiments of the present invention will become more apparent from reading the following Detailed Description of the Preferred Embodiments or by practicing the present invention.

DESCRIPTION OF THE DRAWINGS

The features of the present invention, as well as objects and advantages, will best be understood from reading the appended claims, detailed description and accompanying drawings where:

In the drawings, same reference numbers refer to like components throughout the several figures.

DETAILED DESCRIPTION OF THE PREFERRED EMBODIMENTS

In the following detailed description, reference is made to the accompanying drawings which form a part of this detailed description, and in which, shown by way of illustrative example, specific embodiments are described. These embodiments are described in sufficient detail to enable those of skill in the art to practice the present invention. However, it is to be understood that other embodiments of the present invention not described herein in detail may be utilized. Therefore, the following detailed description is not to be taken in a limiting sense.

Figure 1:
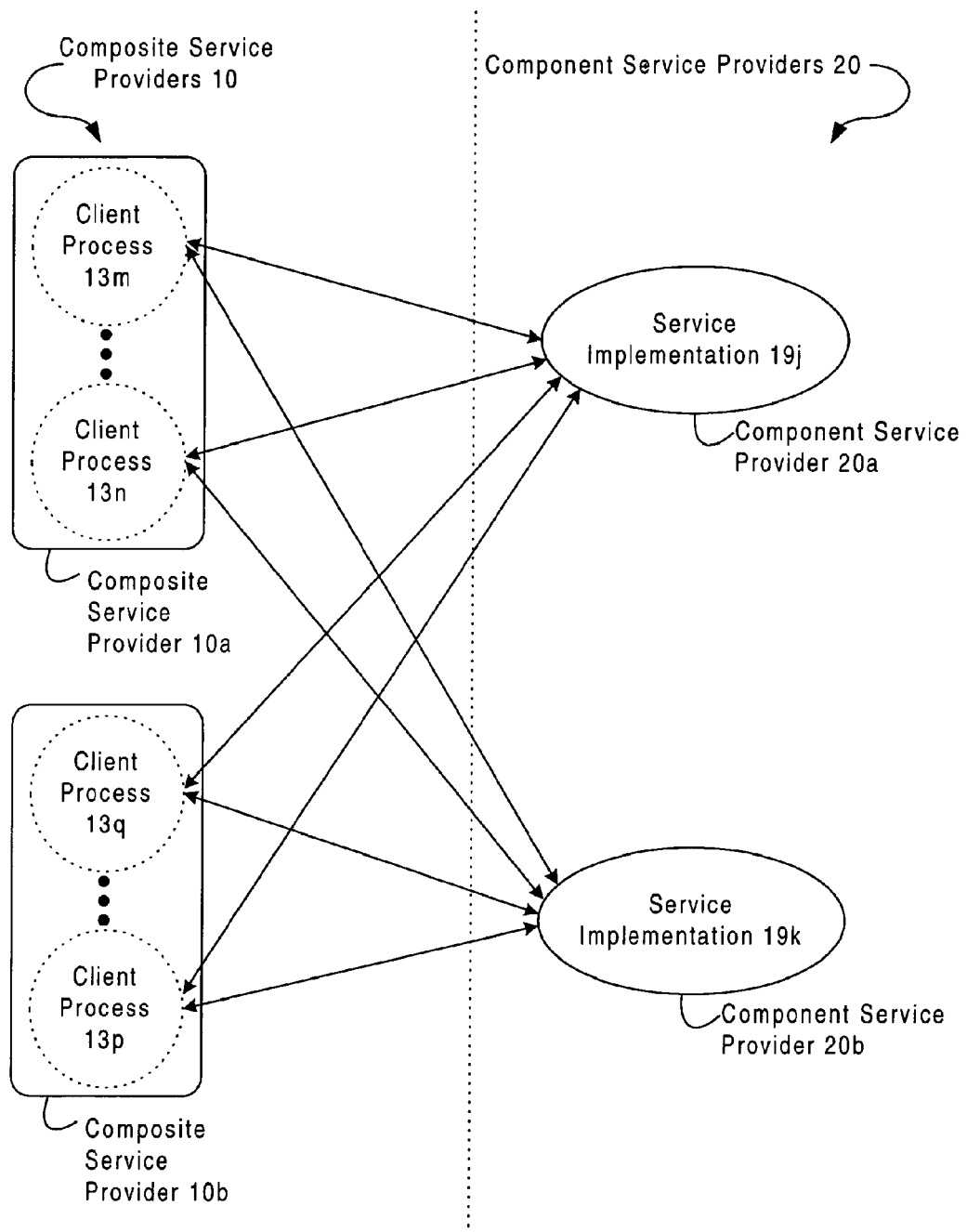
FIG. 1 is a block diagram of a group of component service providers of the prior art.
Figure 2:
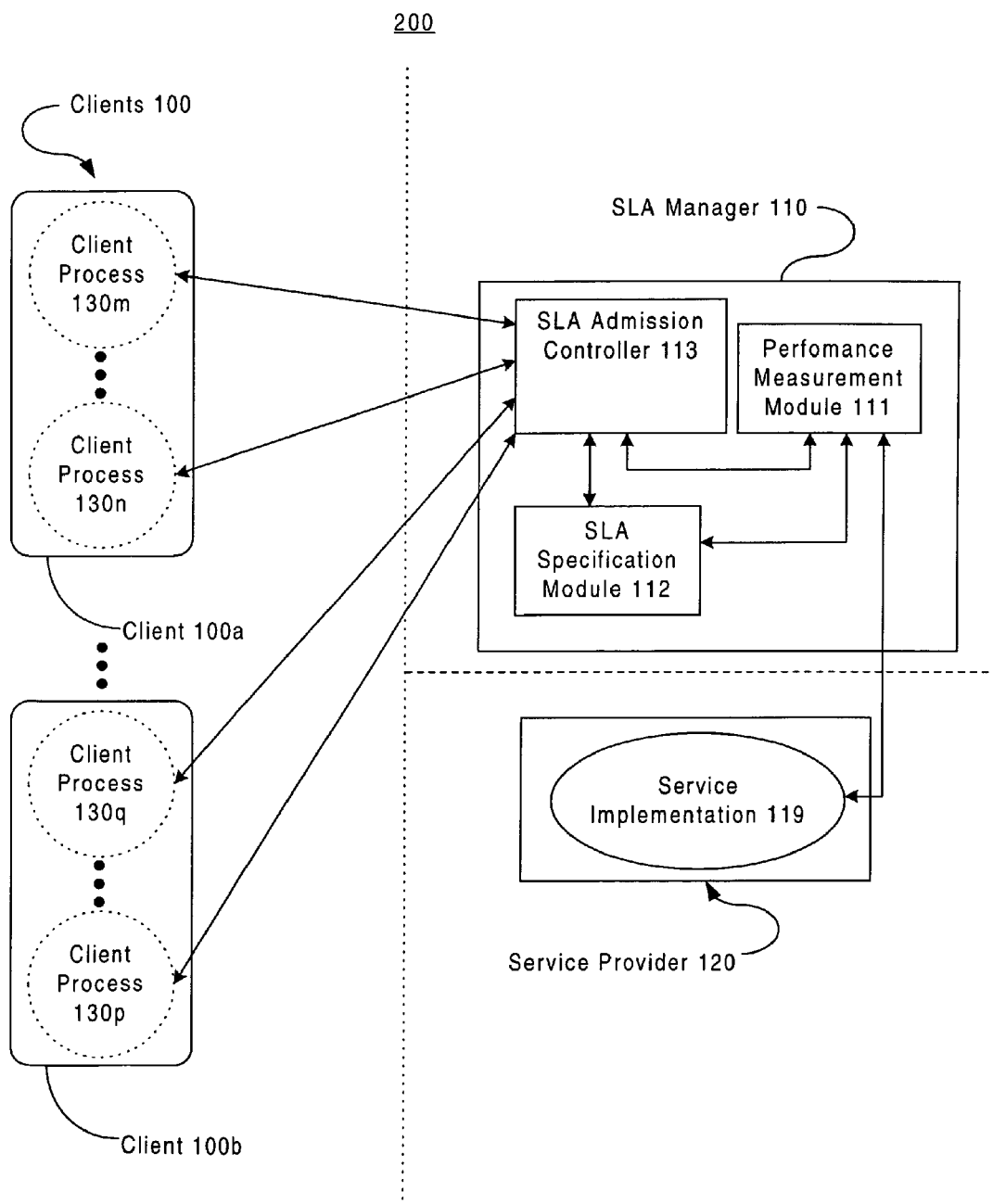
FIGS. 2, 2A and 2B are block diagrams of exemplary embodiments of networks in accordance with the present invention.

Referring to FIG. 2, there is shown a block diagram of an exemplary embodiment of a system 200 in accordance with the present invention. SLA manager 110 may be put into or is in communication with one or more client computer systems ("clients") 100. As illustratively shown, SLA manager is in communication with clients 100a and 100b. Clients 100 may comprise one or more composite service providers, as described elsewhere herein and may comprise one or more computer systems for running one or more client processes. By communication, it is meant electrical, optical, transverse electromagnetic wave, among other forms of communication.

SLA manager 110 may be put into or is in communication with a service provider 120. A service provider 120 provides service implementation 119. Service provider 120 is a component service provider, as described elsewhere herein, and may comprise one or more computer systems for running service implementation 119.

Accordingly, it should be appreciated that SLA manager may contemporaneously manage more than one client 100.

SLA manager 110 provides a front-end for service implementation 119. SLA manager 110 comprises admission controller 113, performance measurement module 111, and specification module 112.

Figure 2A:
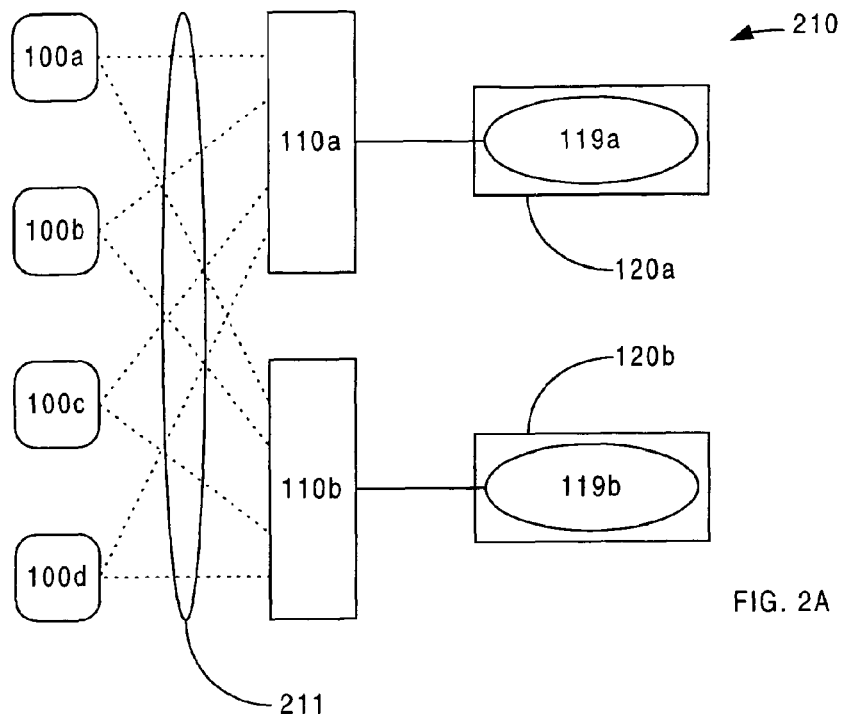

Referring to FIG. 2A, there is shown a block diagram of an exemplary embodiment of a system 210 in accordance with the present invention. System 210 comprises clients 100a through 100d, SLA managers 110a and 110b, and service providers 120a and 120b. Service providers 120a and 120b comprise respective service implementations 119a and 119b. One or more invocation infrastructure 211 may be used for connectivity between clients 100a through 100d and SLA manager 110a and 110b. Accordingly, it should be appreciated that SLA managers 110a and 110b may be used with any invocation infrastructure 211. Moreover, it should be appreciated that a client 100a may be able to access more than one service implementation, such as service implementations 119a and 119b, by using respective SLA managers, such as SLA managers 110a and 110b. Moreover, it should be appreciated that service providers 120a and 120b may be a same provider.

Figure 2B:
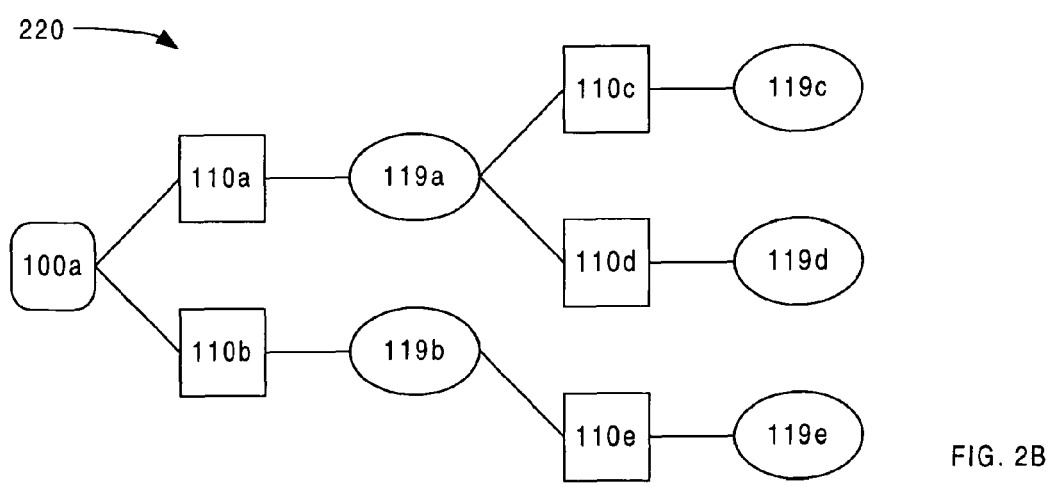

Referring to FIG. 2B, there is shown a block diagram of an exemplary embodiment of a system 220 in accordance with the present invention. Client 100a may access one or more of service implementations 119c through 119e via respective SLA managers 110c through 110e. As illustratively shown, a service implementation may be coupled to a SLA manager downstream from a client and may be coupled to one or more SLA managers farther downstream from the client. For example, service implementation 119 is couple to SLA manager 110a which is downstream from client 100a, and it is coupled to SLA managers 110c and 110d which are further downstream from client 100a than SLA manager 100a.

Figure 3:
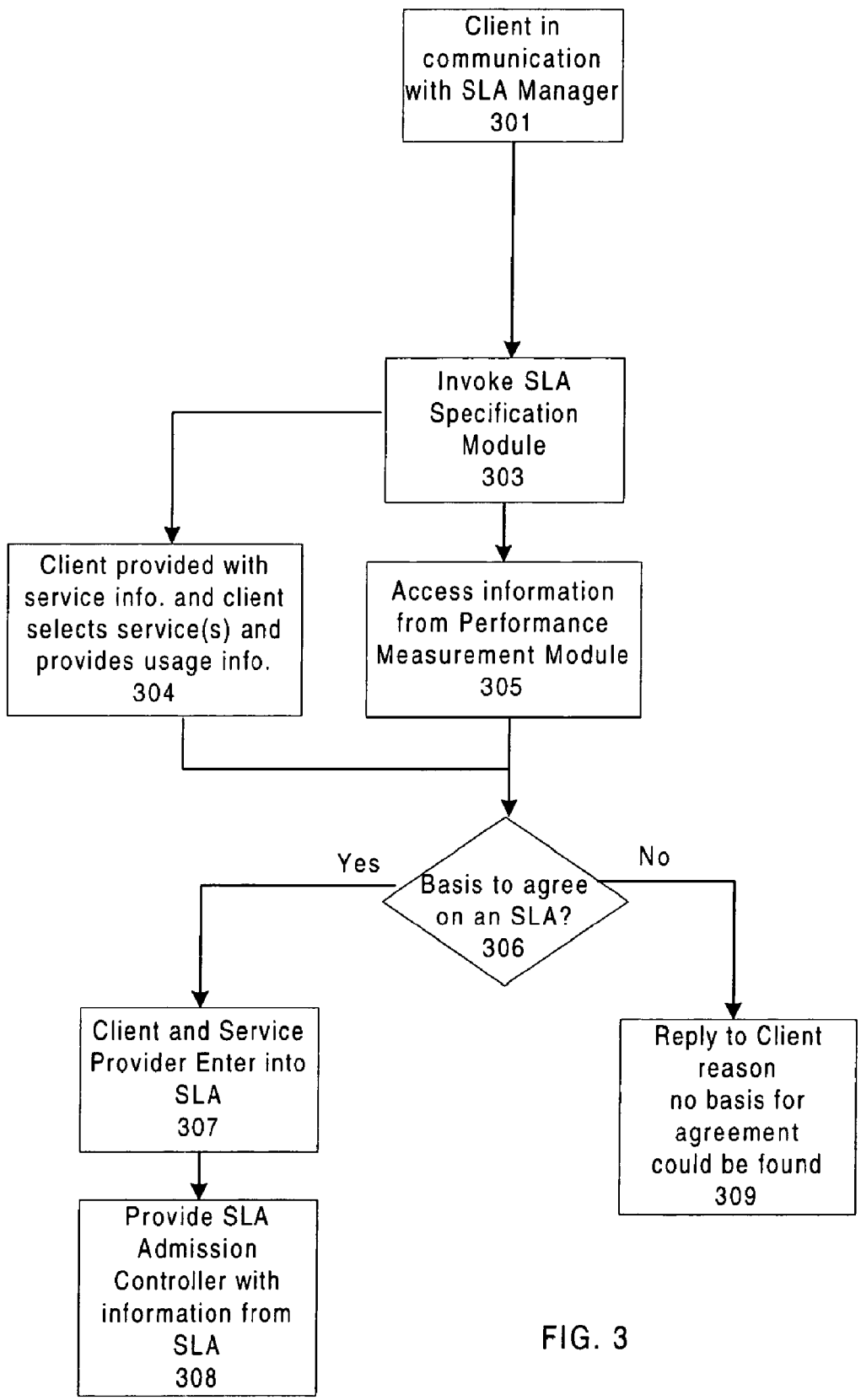
FIG. 3 is a flow diagram of an exemplary embodiment of SLA formation in accordance with the present invention.

With continuing reference to FIG. 2, and additional reference to FIG. 3 where there is shown a flow diagram of an exemplary embodiment of SLA formation in accordance with the present invention, SLA formation is described.

At 301, a client 100a is put in communication with SLA manager 110. This communication may be off-line or on-line. By off-line, it is meant a representative of a client is in contact with a representative of a SLA manager, for example by calling a toll free number to place an order. By on-line, it is meant that a client has contacted a SLA manager using an invocation infrastructure, for example by accessing a web page for this SLA manager and inputting requested information.

At 303 SLA specification module 112 is invoked. At 305, SLA specification module 112 accesses performance information from performance measurement module 111. At 304, a service provider 120 presents a list of offered services or functions to a client 100a, and client 100a specifies its usage parameters for each offered service it selects. Examples of usage parameters include but are not limited to total number of concurrent users, selected services or functions, among others. For services selected, a client may specify peak invocation rate and average invocation rate. By invocation rate, it is meant the number of invocations of a service per unit of time.

At 306, performance information obtained at 305 is compared with service(s) selected and associate usage information obtained at 304 to determine if a basis for a SLA exists. In this context, a basis for such a SLA is availability of resources to satisfy a specified request.

If at 306 a basis for a SLA agreement exists, at 307 client 100a and one or more service providers 120 may enter into a SLA agreement. SLA specification information associated with a resulting SLA agreement is provided to admission controller 113 at 308.

If at 306 there is no basis for agreement, then a reply is sent to client 100a that client provided usage parameters for identified selected services are in excess of service provider's capacity.

Figure 4:
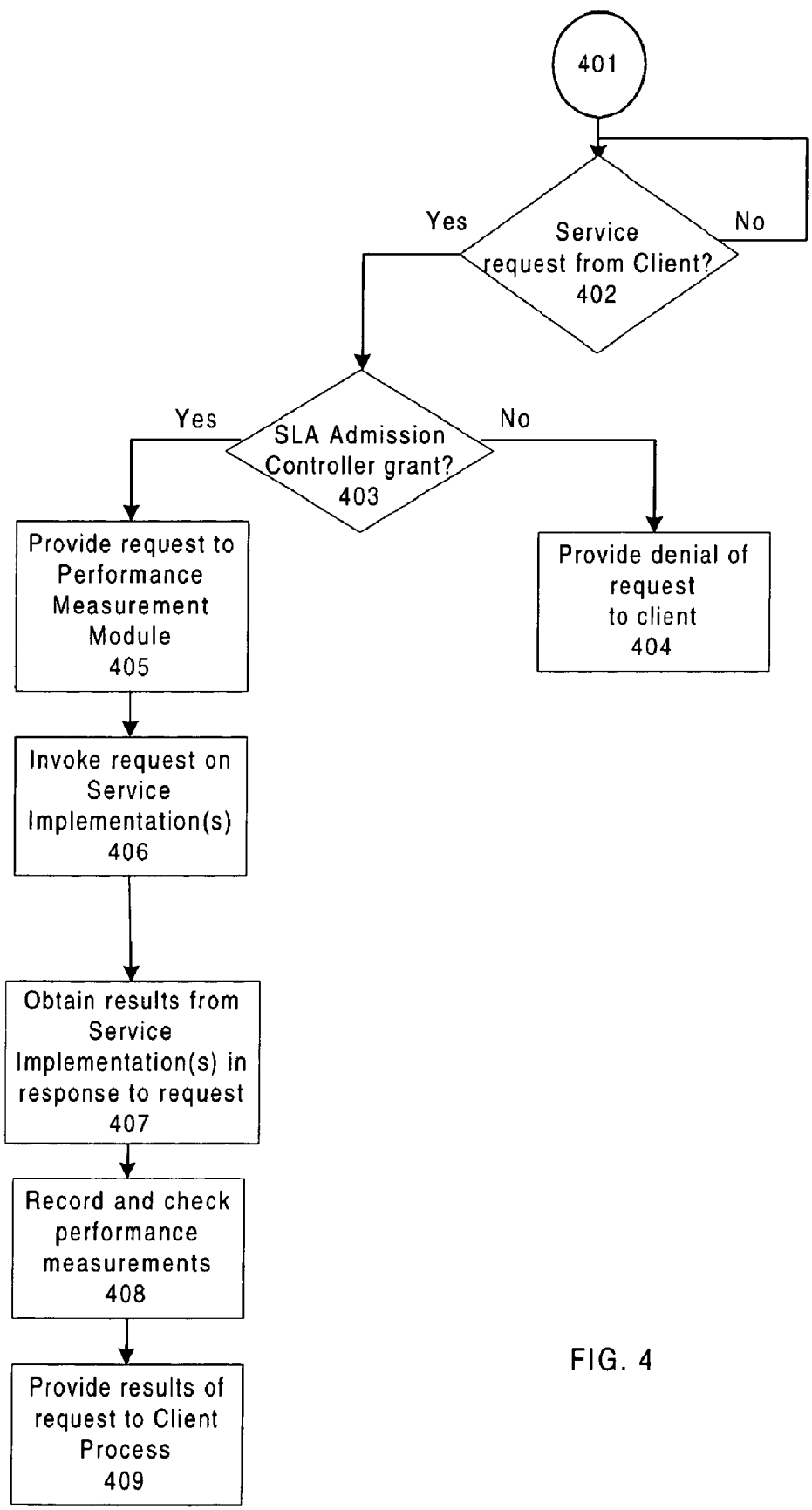
FIG. 4 is a flow diagram of an exemplary embodiment of SLA usage in accordance with the present invention.

With continuing reference to FIG. 2 and additional reference to FIG. 4, where there is shown a flow diagram of an exemplary embodiment of SLA use in accordance with the present invention, processing a service request using a SLA is described.

At 402, admission controller 113 determines if a request from client 100a, for example, is received. If a request is received, then using an existing SLA associated with this received request, admission controller 113 determines whether to accept or reject such request at 403. Admission controller 113 may be configured to maximize a customizable benefit function to one or more service providers 120. By way of example and not limitation, this may entail allocation of resources to clients in accordance with SLAs between clients and service providers. Accordingly, this decision by admission controller 113 may include factors such as impact on SLAs with other clients, potential benefits of servicing a request, potential penalty in rejecting a request, among others.

In an embodiment, a measurement and learning based implementation is used. SLA manager 110 makes an initial estimate of system capacity by measuring system performance under a simulated load. Thereafter, SLA manager 110, through use of performance measurement module 111, continues to measure actual performance of one or more service implementations to refine this initial estimate of the fraction of capacity used by each function. Examples of performance measurements that may be used include requests served per unit of time, bytes served per unit of time, and response time.

By way of example and not limitation, suppose response time is used as a performance indicator. Each function in the interface of a service implementation is associated with a range of time. This range of time denotes minimum and maximum response time for this function. An initial estimate of system capacity may be generated by determining a maximum number of concurrent instances of $f_i$ that can be executed within an acceptable response time. These measurements may further be used to determine the fraction of total capacity consumed by each invocation of $f_i$.

Accordingly, SLA manager 110 has opportunity to learn access patterns of its clients, so an estimate, improved over that simulated by SLA manager 110, of their usage variations may be expressed. SLA manager 110 can learn performance of one or more service implementations under different combinations of functions invoked by clients. This information may be used in combination with well-known optimization techniques to improve service. Some optimization techniques that may be used are found in "Reinforcement Learning for Call Admission Control and Routing in Integrated Service Networks," by Peter Marbach et al., in *Advances in Neural Information Processing Systems*, vol. 10, the MIT Press, 1998.

Capacity of a service provider is denoted by a number of tokens. Each client organization is assigned tokens to cover its SLA manager interaction with an associated service provider. This assignment is managed within SLA manager 110, so it is transparent to clients 100. A product called "Measureware" from Hewlett-Packard Company of Palo Alto, Calif., for resource usage monitoring or a product called "VAM Capacity Planner" from Zitel Corporation of Freemont, Calif., for capacity planning, may be used to obtain an estimate for tokens needed for a request. Moreover, these software tools may be used to aid in determining causes of violation of SLAs. However, use of either or both of these software tools is optional.

At 403, admission controller 113 accepts or rejects an incoming request $R_i$. So when a request of type $R_i$ from client 110a is provided to an SLA manager 110, admission controller 113 checks if there is a sufficient number of available tokens in client 100a's account. If a sufficient number of available tokens exists in client 100a's account, request $R_i$ is accepted and the number of tokens needed for $R_i$ is deducted from client 100a's account. When request $R_i$ is completed, this number of tokens deducted is credited back to client 100a's account. However, if a sufficient number of available tokens does not exist in client 100a's account at the time request $R_i$ is received, then this request is denied, and this denial is provided to client 100a at 404.

If request $R_i$ is accepted at 403, then this request is provided to performance measurement module 111 at 405. Performance measurement module 111 provides request $R_i$ to service implementation 119. At 406, request $R_i$ is invoked for service implementation 119. At 407, in response to this request, results are obtained from this service implementation selected and provided to performance measurement module 111. Performance measurement module 111 records performance measurements associated with execution of this request at 408. Optionally, at 408, performance measurement module 111 may further check performance measurements against SLA specification requirements. At 409, results obtained in response to request $R_i$ are provided from SLA manager 110 to a client, such as client 100a, originating this request.

Although the present invention has been particularly shown and described with respect to certain embodiments thereof, including without limitation a best mode if any, it should be readily apparent to those of skill in the art that various structural, logical, electrical, and other changes in form and detail may be made to these embodiments without departing from the scope of the present invention as set forth in the appended claims. Accordingly, the present invention is defined only by the appended claims that follow this detailed description.

What is claimed is:

1. A system comprising:
a client computer system;
a service provider computer system configured to present to the client computer system a list of service implementations offered, wherein the client computer system is configured to select at least one of the service implementations offered and provide usage information for each selected service implementation; and
a service level agreement manager tangibly embodied in a computing device in communication with the client computer system and the service implementation and configured to receive the usage information for the selected service implementation from the client computer system, the service level agreement manager comprising:
an admission controller configured to control admission of the client computer system to the service implementation using a service level agreement;
a performance measurement module in communication with the admission controller and configured to measure performance of the service implementation; and
a specification module in communication with the admission controller and with the performance measurement module, wherein said specification module is configured to determine whether a basis for forming the service level agreement exists based on the usage information received from the client computer system and the measured performance of the selected service implementation.

2. The system of claim 1, wherein the specification module is configured to compare service implementation performance data and client usage information.

3. The system of claim 2, wherein said client usage information is received from the client and includes anticipated usage information for the selected service implementation.

4. The apparatus of claim 1, wherein said specification module is configured to provide specification information associated with a resulting service level agreement to said admission controller when a basis for forming the service level agreement exists.

5. A method for service level formation, comprising:
providing a client computer system;
presenting to the client computer system a list of service implementations offered by a service provider;
selecting at least one of the service implementations;
providing a service level agreement manager, the service level agreement manager having an admission controller, a specification module and a performance measurement module;
establishing communication between the client computer system and the service level agreement manager;
invoking the specification module of the service level agreement manager;
obtaining performance information from the performance measurement module;
obtaining usage information from the client computer system; and
comparing the obtained performance information for the selected service implementation and the usage information received from the client computer system to determine if there exists a basis for forming a service level agreement.

6. The method of claim 5, further comprising:
forming the service level agreement; and
providing the admission controller with specification information from the service level agreement formed.

7. The method of claim 5, wherein said client usage information includes anticipated usage information for the selected service implementation.

8. An apparatus comprising:
a service provider computer system configured to present to a client computer system a list of service implementations offered;
a service level agreement manager tangibly embodied in one or more computing devices and configured to receive usage information from the client computing system for a selected service implementation based on the list of service implementations, wherein the service level agreement manager includes:
an admission controller configured to control admission of the client computer system to the service implementation using a service level agreement;
a performance measurement module in communication with the admission controller and configured to measure performance of the service implementation; and
a specification module in communication with the admission controller and with the performance measurement module, wherein said specification module is configured to determine whether a basis for forming the service level agreement exists based on the usage information received from the client computer system and the measured performance of the selected service implementation.

9. The apparatus of claim 8, wherein the admission controller is configured to receive information about the service level agreement if the basis for forming the service level agreement exists.

10. The apparatus of claim 8, wherein the service level agreement manager is configured to provide the client computer system with a notification that the usage information received from the client computer system is in excess of a service provider's capacity if no basis for forming the service level agreement exists.

11. The apparatus of claim 8, wherein the usage information includes anticipated usage information for the selected service implementation.

* * * * *